United States Patent [19]
Ostrand

[11] Patent Number: 5,062,352

[45] Date of Patent: Nov. 5, 1991

[54] MOTOR VEHICLE HEATING, VENTILATING AND AIR CONDITIONING SYSTEM WITH COMBINED MODE/TEMPERATURE DOOR

[75] Inventor: James C. Ostrand, Armada, Mich.

[73] Assignee: General Motors Corporation, Detroit, Mich.

[21] Appl. No.: 552,630

[22] Filed: Jul. 16, 1990

[51] Int. Cl.⁵ ............................................ B60H 1/26
[52] U.S. Cl. .................... 98/2.08; 98/2.11; 165/42; 237/12.3 A
[58] Field of Search ............... 98/2, 2.05, 2.08, 2.11; 165/42, 43; 237/12.3 A, 12.3 B

[56] References Cited

U.S. PATENT DOCUMENTS 4,683,913  8/1987  Hoffman et al. ............... 137/625.4
4,828,018  5/1989  Hoffman ............................ 165/42

FOREIGN PATENT DOCUMENTS 68414   5/1980  Japan ............................... 98/2.11
2168786 6/1986  United Kingdom ......... 237/12.3 A Primary Examiner—Harold Joyce
Attorney, Agent, or Firm—Ronald L. Phillips

[57] ABSTRACT

A motor vehicle heating, ventilating and air conditioning system having a combined mode and temperature door that can be controlled by a single selector for automatic or manual automotive air conditioning control.

3 Claims, 3 Drawing Sheets

MOTOR VEHICLE HEATING, VENTILATING AND AIR CONDITIONING SYSTEM WITH COMBINED MODE/TEMPERATURE DOOR

TECHNICAL FIELD

This invention relates to motor vehicle heating, ventilating and air conditioning systems and more particularly to the mode and temperature door arrangements therein.

BACKGROUND OF THE INVENTION

In conventional modern day motor vehicle passenger compartment heating, ventilating and air conditioning systems, it is common practice to mount a heater core downstream of an evaporator in an air duct and to continuously circulate engine coolant through the heater core. For air conditioning, refrigerant is circulated through the evaporator and temperature control is obtained by controlling the flow of air from the evaporator relative to the heater core. For example, for maximum cooling demand all of the air flow from the evaporator is bypassed around the heater core and thence into the passenger compartment. On the other hand, for minimum cooling demand, all of the air flow from the evaporator is passed through the heater core and thence delivered to the passenger compartment. And intermediate these two extremes, the bypass flow and that through the heater core are mixed and varied to provide an intermediate temperature air delivery to the passenger compartment. Furthermore, the outlets from the duct downstream from the bypass and heater core are strategically placed to provide the best air distribution for the heating, cooling and defrosting modes as is well known. Typically, in such systems, the mode selection is obtained by one air door(s) and the temperature of the air being delivered is controlled by another separate air door(s) upstream of the former. And while such systems have proven very satisfactory, there remains a continuous quest for reduction in both the size of the system and the number of parts making up the system as well as improved air flow, temperature blending and flexible delivery control.

SUMMARY OF THE INVENTION

The present invention offers a quite simple solution to meeting these goals with the use of a combined mode and temperature door that can be controlled by a single selector for automatic or manual operation, the combining of the mode and temperature door resulting in both reduced module size and reduced number of parts necessary to construct the system. According to the present invention, there is provided an air duct having an inlet at one end and terminating at another end in a cylindrical portion having a defroster outlet, an air conditioning outlet and a heater outlet. The outlets are angularly spaced from each other and the air duct is divided into parallel arranged first and second passages for connecting the outlets to the inlet. The evaporator is mounted in one of the passages while the heater is mounted in the other and thus is connected in parallel with the evaporator between the inlet and outlets. A combined rotary mode/temperature door is mounted in the cylindrical duct portion and has angularly arranged openings that are operable in a first mode to fully open the first passage and the air conditioning outlet while closing the heater and defroster outlets and the second passage to effect full cold operation. The door is then further operable in a second mode to leave the first passage partially open while partially opening the air conditioning outlet and the second passage and closing the defroster outlet and heater outlet to effect mixed hot and cold operation. Then, in a third mode, the mode/temperature door is operable to still leave the first passage partially open and the defroster outlet closed while further closing the air conditioning outlet, partially opening the heater outlet, and further opening the second passage to effect bi-level mixed hot and cold operation. Then, in a fourth mode, the mode/temperature door is operable to fully open the second passage and the heater outlet while closing the first passage and the air conditioning outlet and partially opening the defroster outlet to effect full hot heater defroster operation. And finally, in a fifth mode, the door is operable to fully open the second passage while partially opening the defroster outlet and heater outlet and closing the first passage and air conditioning outlet to effect full hot heater and defroster bleed operation. Furthermore, with this arrangement, the mixing of hot and cold air is always within the rotary door to provide good, even mixing for eventual distribution into the passenger compartment.

It is therefore an object of the present invention to provide a new and improved motor vehicle passenger compartment heating, ventilating and air conditioning system.

Another object is to provide in a motor vehicle passenger compartment heating, ventilating and air conditioning system a combined mode and temperature door that can be controlled by a single selector for automatic or manual operation to effect a full range of air temperature and air distribution conditions.

Another object of the present invention is to provide in a motor vehicle passenger compartment heating, ventilating and air conditioning system a combined rotary mode and temperature door that results in a reduced sized module and reduced parts count.

These and other objects, advantages and features of the present invention will become more apparent from the following description and drawing in which:

DESCRIPTION OF THE PREFERRED EMBODIMENT

Figure 1:
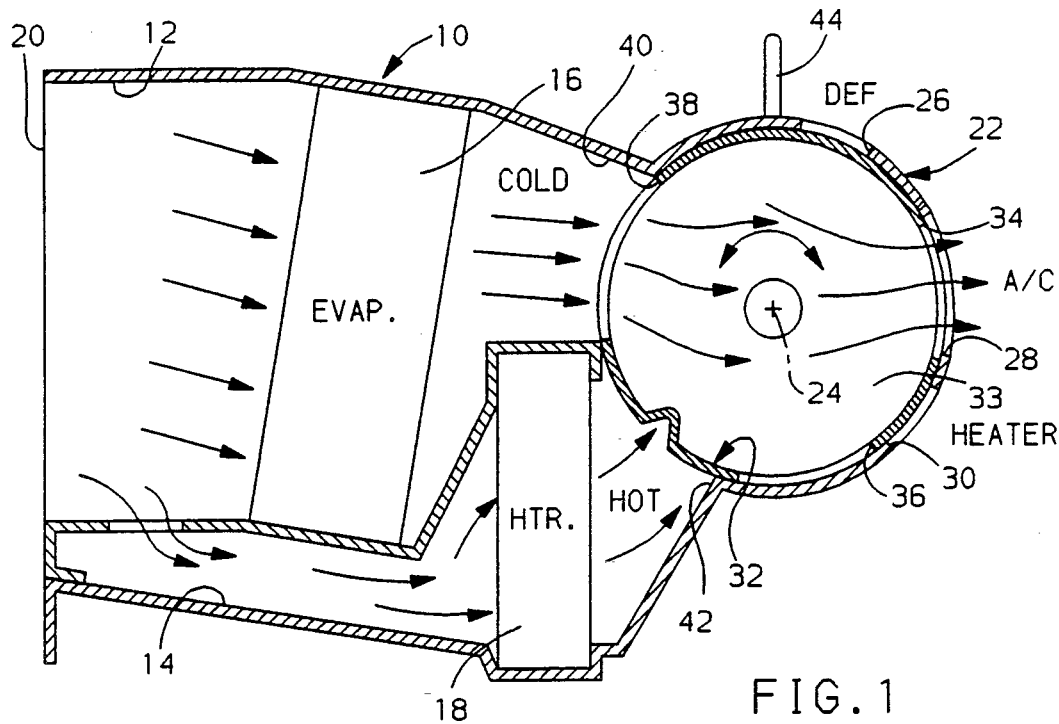
FIG. 1 is a diagrammatical longitudinal sectional view of a portion of a motor vehicle passenger compartment heating, ventilating and air conditioning system according to the present invention.

Referring to FIG. 1, there is shown a terminal portion of a motor vehicle passenger compartment heating, ventilating and air conditioning system comprising an air duct 10 having a first passage 12 of large cross-sectional flow area and a second passage 14 of small cross-sectional flow area connected in parallel with the first passage 12. An evaporator 16 is mounted in the large passage 12 (thus the cold passage) and a heater 18 is mounted in the second passage 14 (thus the hot passage). Air from a blower (not shown) is delivered to the entrance 20 of the air duct shown where it may pass through the evaporator via the wide cold passage 12 and/or the heater 18 via the narrow hot passage 14 as will be described in detail later.

The air duct 10 terminates in a cylindrical portion 22 having a center line 24 at right angles to the direction of air flow indicated by the arrows exiting from the air duct passages 12 and 14. The cylindrical portion 22 of the air duct has a defroster outlet 26, air conditioning outlet 28 and heater outlet 30 angularly spaced from each other. This spacing is such that the heater outlet is directed generally radially downward, the defroster outlet is directed generally radially upward, and the air conditioning outlet located intermediate the defroster and heater outlets is directed generally horizontally in the passenger compartment.

A hollow cylindrical rotary mode/temperature door 32 having closed ends 33 is mounted in the cylindrical duct portion 22 for rotary movement about the center line or axis 24 of this duct portion. And in contrast with the air duct outlets, the mode/temperature door has two radial outlet openings 34 and 36 angularly positionable relative to the three (3) duct outlets and a single radial inlet opening 38 angularly positionable relative to the exits 40 and 42 of the two air duct passages 12 and 14, respectively. The rotary mode/temperature door outlet openings 34 and 36 and inlet opening 38 are arranged relative to the duct outlets and the air duct exits so that the rotary door, when positioned as shown in FIG. 1, fully opens the cold air passage 12 and closes the hot air passage 14 while fully opening the air conditioning outlet 28 and closing both the defroster outlet 26 and heater outlet 30. This is the full cold air conditioning mode.

Figure 2:
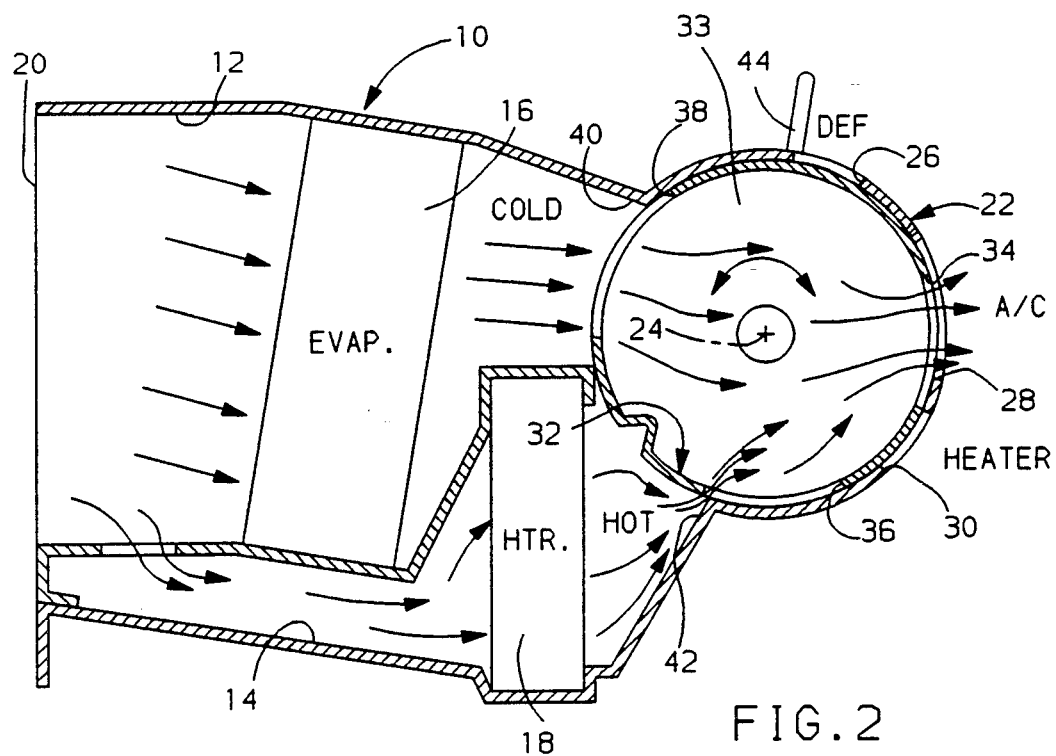
FIGS. 2-5 are similar to FIG. 1 but show the mode/temperature door in different positions.
Figure 3:
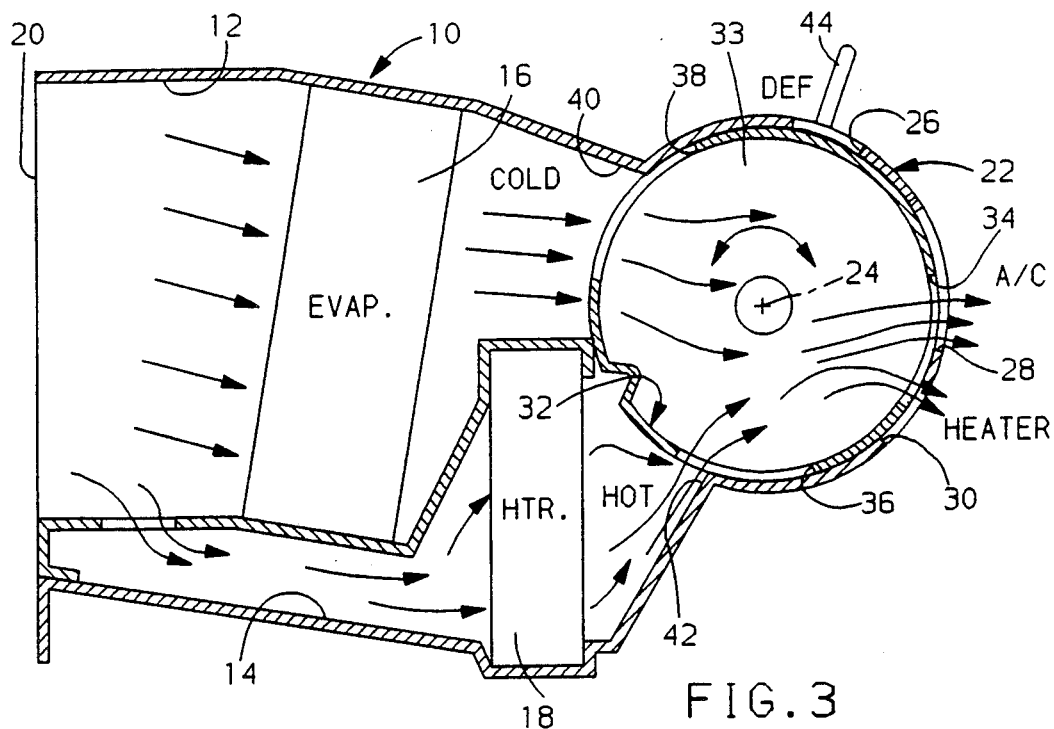

The rotary mode/temperature door is rotatable by a single selector lever 44 from the position shown in FIG. 1 in the clockwise direction to the mixed temperature mode position shown in FIG. 2. In this mode, the rotary mode/temperature door leaves both the cold passage 12 and the air conditioning outlet 28 partially open but now also partially opens the hot air passage 14 while maintaining the defroster outlet 26 closed. And such movement can continue on to further provide more warmed air to the cooled air for a warmer outlet temperature at the air conditioning outlet, the heater door remaining closed as shown. Then as the mode/temperature door 32 is rotated further clockwise by the selector 44, the air within the door is blended with increasingly warmer air with such blended air then flowing from both the air conditioning outlet and from the heater outlet to provide a bi-level mixed temperature mode as seen in FIG. 3. In this position it will be seen that the mode/temperature door as compared to FIG. 2 continues to close off the cold air passage and the air conditioning outlet while simultaneously opening the heater outlet and the hot air passage further, with good mixing occurring as shown by the arrows.

Figure 4:
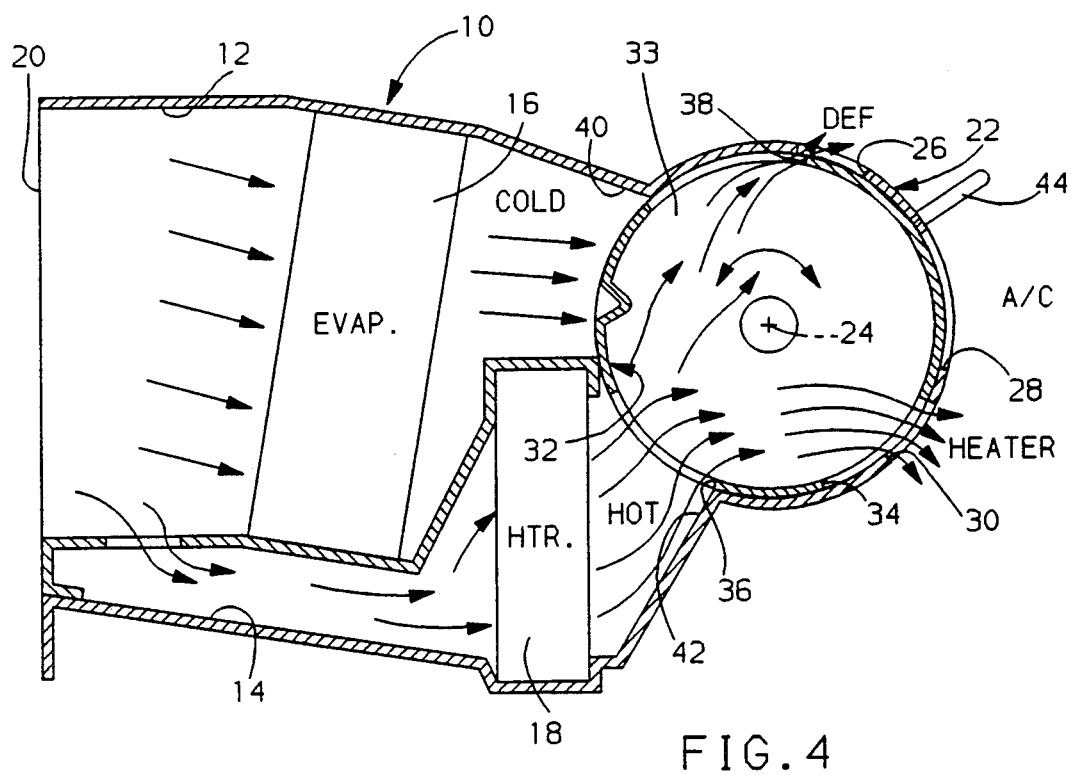

The mode/temperature door can then be rotated further clockwise where the air then begins to flow exclusively from the heater outlet and eventually some bleed from the defroster outlet. This is accomplished as seen in FIG. 4 by the rotary mode/temperature door being positionable to completely close the cold air passage 12 while fully opening the hot air passage 14, partially open the defroster outlet 26, completely close the air conditioning outlet 28 and fully open the downwardly directed heater outlet 30.

Figure 5:
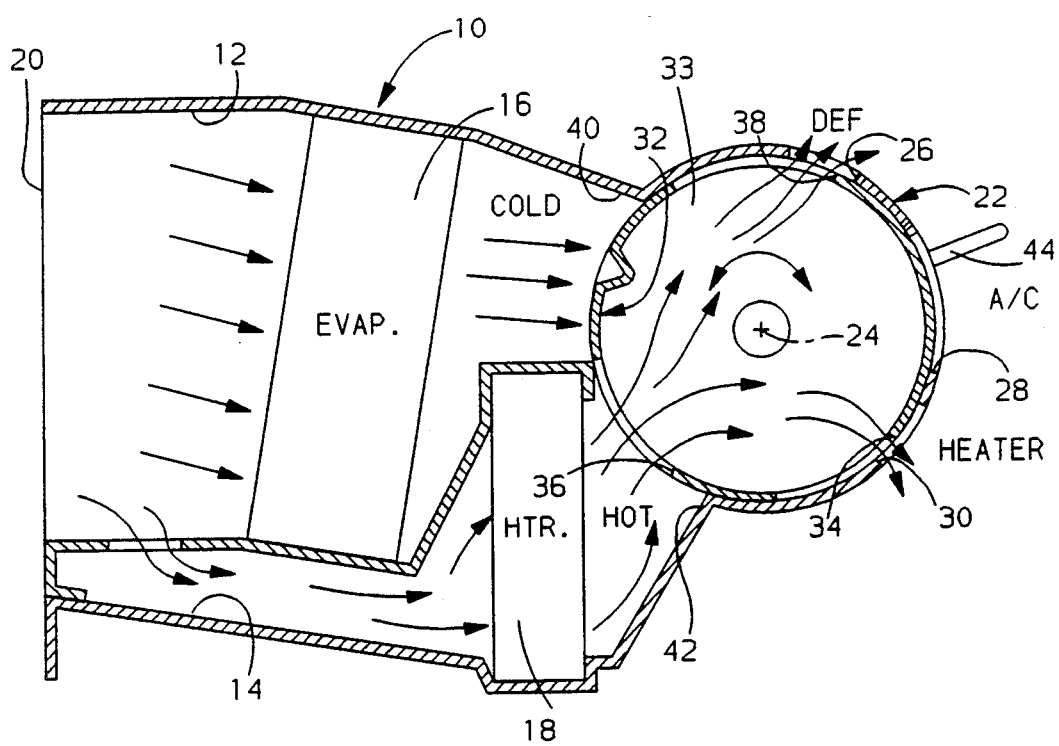

Finally, the mode/temperature door is positionable by the selector lever 44 to provide both defrosting and heating full hot and full defrost as shown in FIG. 5. In this position, it will be seen that the mode/temperature door continues to fully close the cold air passage 12 while almost fully opening the hot air passage 14 and the defroster outlet 26 and only partially opening the heater outlet 30. As a result, heated air from the upward zone is directed through the defroster outlet for defrosting purposes while some heated air is also being delivered downward through the heater outlet 30 to the passenger compartment's lower zone.

Furthermore, it will be appreciated that an infinite variety of modes and temperatures can be achieved by various degrees of openings and closings of the various outlets and air passages by the single mode/temperature door.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A motor vehicle passenger compartment heating, ventilating and air conditioning system comprising an air duct having an inlet at one end and a defroster outlet, air conditioning outlet and heater outlet at another end, said air duct having parallel arranged first and second passages for connecting said outlets to said inlet, an evaporator mounted n said first passage, a heater mounted in said second passage, and singular mode/temperature door means mounted in said duct between said passages and outlets for (1) fully opening said first passage and air conditioning outlet while closing said defroster outlet, heater outlet and second passage to effect within said door means a first mode providing full cold operation, (2) fully opening said first passage while partially opening said air conditioning outlet and second passage and closing said defroster outlet and heater outlet to effect within said door means a second mode providing mixed hot and cold operation, (3) fully opening said first passage while partially opening said second passage, air conditioning outlet and heater outlet and closing said defroster outlet to effect within said door means a third mode providing bi-level mixed hot and cold operation, (4) fully opening said second passage and heater outlet while closing said first passage and air conditioning outlet and partially opening said defroster outlet to effect within said door means a fourth mode providing full hot heater/defroster operation, and (5) fully opening said second passage while partially opening said defroster outlet and heater outlet and closing said first passage and air conditioning outlet to effect within said door means a fifth mode providing full hot heater and defroster bleed operation.

2. A motor vehicle passenger compartment heating, ventilating and air conditioning system comprising an air duct having an inlet at one end and terminating at another end in an end portion having a defroster outlet, air conditioning outlet and heater outlet, said outlets being angularly spaced from each other, said air duct having parallel arranged first and second passages with large and small cross-sectional flow areas, respectively, for connecting said outlets to said inlet, an evaporator mounted in said first passage, a heater mounted in said second passage, and singular rotary mode/temperature door means mounted in said end portion for (1) fully opening said first passage and air conditioning outlet while closing said defroster outlet, heater outlet and second outlet to effect within said door means a first mode providing full cold operation, (2) fully opening said first passage while partially opening said air conditioning outlet and second passage and closing said defroster outlet and heater outlet to effect within said door means a second mode providing mixed hot and cold operation (3) fully opening said first passage while partially opening said second passage, air conditioning outlet and heater outlet and closing said defroster outlet to effect within said door means a third mode providing bi-level mixed hot and cold operation, (4) fully opening said second passage and heater outlet while closing said first passage and air conditioning outlet and partially opening said defroster outlet to effect within said door means a fourth mode providing a full hot heater/defroster operation, and (5) fully opening said second passage while partially opening said defroster outlet and heater outlet and closing said first passage and air conditioning outlet to effect within said door means a fifth mode providing full hot heater and defroster bleed operation.

3. A motor vehicle passenger compartment heating, ventilating and air conditioning system comprising an air duct having an inlet at one end and terminating at another end in a cylindrical portion having a defroster outlet, air conditioning outlet and heater outlet, said outlets being angularly spaced from each other with said air conditioning outlet intermediate said other outlets, said air duct having parallel arranged first and second passages for connecting said outlets to said inlet, an evaporator mounted in said first passage, a heater mounted in said second passage, and singular rotary mode/temperature door means mounted in said cylindrical duct portion for (1) fully opening said first passage and air conditioning outlet while closing said defroster outlet, heater outlet and second passage to effect within said door means a first mode providing full cold operation, (2) fully opening said first passage while partially opening said air conditioning outlet and second passage, and closing said defroster outlet and heater outlet to effect within said door means a second mode providing mixed hot and cold operation, (3) fully opening said first passage while partially opening said second passage, air conditioning outlet and heater outlet and closing said defroster outlet to effect within said door means a third mode providing bi-level mixed hot and cold operation, (4) fully opening said second passage and heater outlet while closing said first passage and air conditioning outlet and partially opening said defroster outlet to effect within said door means a fourth mode providing full hot heater/defroster operation, and (5) fully opening said second passage while partially opening said defroster outlet and heater outlet and closing said first passage and air conditioning outlet to effect within said door means a fifth mode providing full hot heater and defroster bleed operation.

* * * * *